US012413551B2

(12) United States Patent
Hoang et al.

(10) Patent No.: US 12,413,551 B2
(45) Date of Patent: Sep. 9, 2025

(54) METHODOLOGY TO EXPEDITE VLAN SCANNING

(71) Applicant: Mavenir Systems, Inc., Richardson, TX (US)

(72) Inventors: Chi Thanh Hoang, Brossard (CA); Aiqun Sun, Nepean (CA)

(73) Assignee: Mavenir Systems, Inc., Richardson, TX (US)

( * ) Notice: Subject to any disclaimer, the term of this patent is extended or adjusted under 35 U.S.C. 154(b) by 104 days.

(21) Appl. No.: 18/451,469

(22) Filed: Aug. 17, 2023

(65) Prior Publication Data

US 2024/0073181 A1 Feb. 29, 2024

Related U.S. Application Data

(60) Provisional application No. 63/401,348, filed on Aug. 26, 2022.

(51) Int. Cl.
*H04L 61/5014* (2022.01)
*H04L 12/46* (2006.01)

(52) U.S. Cl.
CPC ...... *H04L 61/5014* (2022.05); *H04L 12/4641* (2013.01)

(58) Field of Classification Search
CPC .................... H04L 61/5014; H04L 12/4641
See application file for complete search history.

(56) References Cited

U.S. PATENT DOCUMENTS

2007/0097972 A1* 5/2007 Jain ................. H04L 12/4641
370/392
2012/0131097 A1 5/2012 Baykal et al.
2015/0312208 A1 10/2015 Chatterjee et al.
2020/0301764 A1* 9/2020 Thoresen ............ G06F 9/45541
2022/0312211 A1* 9/2022 Arai ..................... H04W 12/50

FOREIGN PATENT DOCUMENTS

CN 101883158 A 11/2010
EP 3324603 A1 * 5/2018

OTHER PUBLICATIONS

Extended European Search Report for corresponding European Application No. EP 23193139.5; 10 pages, dated Dec. 18, 2023.
ORAN Alliance Working Group 4 "Management Plane Specification, ORAN.WG4.MP.0-v06.00", 0-RAN Alliance Jan. 1, 2021.

* cited by examiner

*Primary Examiner* — Kamal M Hossain
(74) *Attorney, Agent, or Firm* — Ruggiero McAllister & McMahon LLC

(57) ABSTRACT

An method for expediting Virtual Local Area Network (VLAN) scanning for Dynamic Host Configuration Protocol (DHCP) server includes: transmitting, by a software tool, VLAN ethernet trunk frames including VLAN Identifier (ID) 1 to VLAN ID 4095, to an ethernet interface of a radio unit (RU), the ethernet interface being connected via an ethernet switch to a distributed unit (DU), wherein the DHCP server is located at the DU; selectively forwarding, by the ethernet switch to the DU, only a VLAN ethernet trunk frame having VLAN ID value X predefined by operator of the O-RAN system; selectively responding, by the DU, in response to receiving the VLAN ethernet trunk frame having VLAN ID value X, by sending a DHCP response message to the RU; and identifying, by the RU from the DHCP response message, the VLAN ID value X corresponding to the DHCP server.

20 Claims, 4 Drawing Sheets

METHODOLOGY TO EXPEDITE VLAN SCANNING

CROSS-REFERENCE TO RELATED APPLICATIONS

The present application claims priority to U.S. Provisional Patent Application No. 63/401,348, filed on Aug. 26, 2022, the entirety of which is incorporated by reference herein.

BACKGROUND OF THE INVENTION

The present disclosure relates to Virtual Local Area Network (VLAN), and relates more particularly to a method and a system for expediting Virtual Local Area Network (VLAN) scanning process.

Most of the existing VLAN scanning solutions are very slow because they use a simple procedure defined by Open Radio Access Network (O-RAN) Alliance. In this O-RAN Alliance-defined procedure, i) Dynamic Host Configuration Protocol (DHCP) client sends DHCP DISCOVERY messages to all 4095 possible VLAN, and ii) a wait time of 5 seconds is needed per VLAN address for an eventual reply from a DHCP server containing a DHCP offer, which means a total wait time can be up to 5.6 hours (5 seconds multiplied by 4095). The faster the network can discover the DHCP server, the faster the radio becomes operational to serve mobile traffic from the power-up state. However, it is not reasonable to expect a VLAN operator to reduce the number of M-Plane VLAN nodes to avoid the long scan time.

A known approach for dealing with the above-mentioned problem of slow VLAN scan time is to define a small subset range of VLAN ID to scan, thereby reducing the number of VLAN nodes to scan and reducing the overall scan delay. However, this conventional approach still suffers from a long delay and requires tedious manual configuration by a field engineer to configure each radio individually via a Command Line Interface (CLI) command. In addition, this approach is not plug-and-play or robust. For example, if the operator decides to change the network VLAN assignment that is outside of the configured range, the radio will not be able to connect to the Distributed Unit (DU), thus making the radio inaccessible remotely. Resolving this situation requires access to the radio locally, which typically requires a costly field visit by a field engineer.

Therefore, there is a need for an optimized method and a system for expediting the Virtual Local Area Network (VLAN) scanning process, e.g., for expediting the discovery of the Management Plane (M-Plane) Dynamic Host Configuration Protocol (DHCP) server.

SUMMARY OF THE INVENTION

According to an example embodiment of the present disclosure, a method is presented which reduces the time it takes to perform a full VLAN scan (e.g., for the discovery of the M-Plane DHCP server) to less than 5 seconds, e.g., by utilizing efficient raw ethernet packet injection to the network and listening for DHCP server reply.

According to an example embodiment of the present disclosure, the example method of utilizing efficient raw ethernet packet injection to the network and listening for DHCP server reply is applicable for Internet Protocol version 4 (IPv4) and/or Internet Protocol version 6 (IPv6) networks.

According to an example embodiment of the method according to the present disclosure, the following are performed:

a) Discovering the proper DHCP server:
  1) First, the network is rapidly scanned to discover the VLAN ID where the DHCP server is located. The scanning process is done by sending DHCP discovery packets for the entire VLAN Identifier (ID) range (1 to 4095), which discovery packets are injected using the raw packet infrastructure provided by the operating system.
  2) Once the VLAN ID (value "X" within the range of possible values 1 to 4095, "X" being specified by the network operator) corresponding to the DHCP server is retrieved from the DHCP response sent by the DHCP server, a software (an example of which will be referenced as "turbofast_vlan_discovery" software, which can be on any device on a LAN seeking to discover the DHCP server, which software is executed by a processor) will create the VLAN ethernet interface using the retrieved VLAN ID.

b) Subsequently, the DHCP client is started over the VLAN Ethernet interface where the DHCP protocol is executed to receive the IP address from the DHCP server.

DETAILED DESCRIPTION OF THE INVENTION

According to a first example embodiment of the present disclosure, a method is presented in which i) fast scanning and discovery of the DHCP server is followed by ii) running a DHCP client over the VLAN ID interface found from step i). In the sections below, these two steps will be explained in detail.

Fast Scanning/Discovery: First, a raw ethernet VLAN trunk frame is created as per Institute of Electrical and Electronics Engineers (IEEE) 802.1q protocol. We then iteratively transmit all the VLAN trunk frames from VLAN ID 1 to VLAN ID 4095 (maximum VLAN ID) to the Ethernet interface of the radio (e.g., RU). The transmission of these VLAN Ethernet frames is performed by a software tool (e.g., executed by a processor) that injects raw Ethernet packets into the operating system's Ethernet device driver. According to an example embodiment, the software tool can be a software running in Linux™, which software tool performs the injection (transmission) and the inspection (reception) of raw Ethernet packets to/from the physical Ethernet interface by using the raw socket application programming interface (API) service offered by the operating system. Although Linux™ is described as the example operating system in this example, it can be any others operating system offering the same kind of service. The Ethernet interface is physically connected to the O-RAN distributed unit (DU) via an Ethernet switch, or directly connected to the DU in case the DU has a built-in Ethernet switch.

Figure 1:
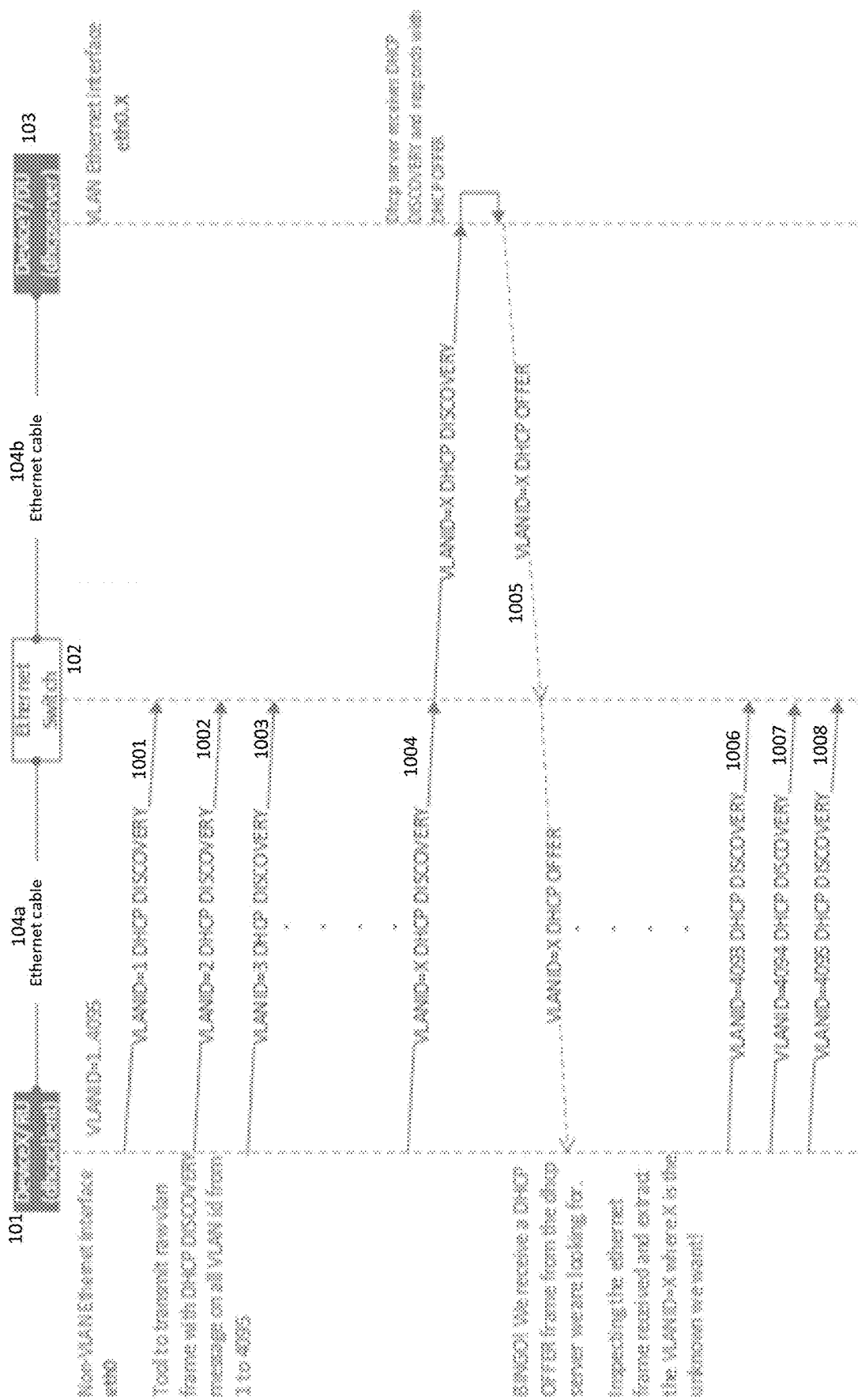
FIG. 1 illustrates an example method of a VLAN scan IPv4 to find a DHCP server IPv4.
Figure 3:
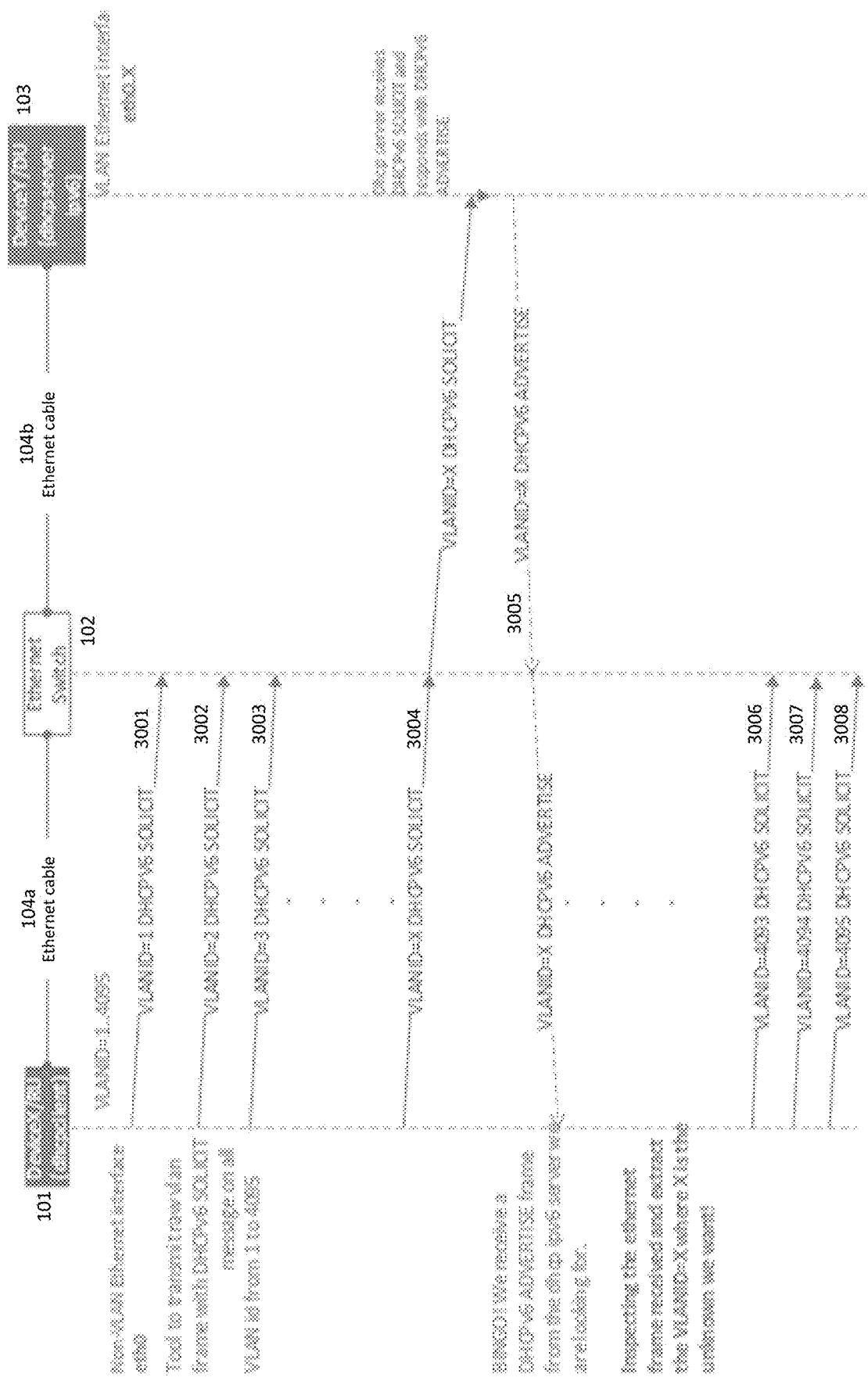
FIG. 3 illustrates an example method of a fast VLAN scan IPv6 to find a DHCP server IPv6.

In one example embodiment, the VLAN trunk frame is a DHCP Internet Protocol version 4 (IPv4) DISCOVERY packet, e.g., as illustrated in FIG. 1. In another example embodiment, the VLAN trunk frame is a DHCP Internet Protocol version 6 (DHCPv6) SOLICIT packet, as illustrated in FIG. 3. These packets are broadcast as part of the DHCP process for a DHCP client to search for the DHCP server. As an example, all 4095 VLAN packets can be sent within 300 ms to the network from a 1G ethernet. According to the example embodiments of the present disclosure, a large amount of DHCP messages (e.g., DISCOVERY or SOLICIT messages) in a short period of time. According to an example embodiment, inter-packet delay can be inserted to avoid flooding the ethernet switch. It should be noted that modern O-RAN networks should easily be able to accommodate a relatively high packet rate.

In the case of the example embodiment shown in FIG. 1, the DHCP server is discovered on a preconfigured VLAN and will respond back to the originator of the DHCP DISCOVERY message with a DHCP OFFER message. In the case of the example embodiment shown in FIG. 3, the DHCP server is discovered on a preconfigured VLAN and will respond back to the originator of the DHCP SOLICIT message with a DHCP ADVERTISE message. The radio (e.g., radio unit (RU)) will receive the response and inspect the VLAN ID contained in the received IEEE 802.1q Ethernet frame.

Running the DHCP client over VLAN ID interface: Once the VLAN ID has been retrieved from the DHCP response, a software (an example of which will be referenced as "turbofast_vlan_discovery" software, which can be on any device on a LAN desiring to discover the DHCP server) executed by a processor creates the proper virtual VLAN ethernet interface using the retrieved VLAN ID. In the example embodiment of the present disclosure, the "turbofast_vlan_discovery" software can be on the radio (e.g., RU), a personal computer (PC) or a network printer connected with an ethernet cable, for example. The "turbofast_vlan_discovery" software can be the same software tool (mentioned earlier) that performs transmission of the VLAN Ethernet frames, or "turbofast_vlan_discovery" software can be distinct from the software tool that performs transmission of the VLAN Ethernet frames. After the creation of the VLAN interface, a DHCP client is started over the VLAN interface where the DHCP protocol is executed to receive the IP address from the DHCP server. This step is very fast, as the DHCP client is run over an interface with the VLAN ID where the DHCP server is located, and this step involves a DHCP handshake between the client and the server. The discovered VLAN ID is then stored, e.g., in persistent memory, so it can be used again after a reboot of the system. If the VLAN ID has been changed, the DHCP client will fail, and this will trigger a new scan of the network, but given that the scan is very fast, the cost of running a new scan is minimal.

FIG. 1 illustrates an example method of fast VLAN scan IPv4 to find a DHCP server IPv4. In FIG. 1, Device X 101 (e.g., an RU which is DHCP client) is connected by an Ethernet cable 104*a* to an Ethernet switch 102, which is in turn connected by an Ethernet cable 104*b* to Device Y 103 (e.g., a DU which is DHCP server). As an alternate example embodiment, Device X 101 can be connected directly to Device Y 103 (e.g., in case Device Y 103 has a built-in Ethernet switch). Device X 101 sends to the network (using non-VLAN Ethernet interface "eth0") the raw VLAN ethernet trunk frames for VLAN ID 1 to VLAN ID 4095. In the example of FIG. 1, the VLAN trunk frames are DHCPv4 DISCOVERY packets (messages), e.g., VLAN ID 1 DHCP DISCOVERY packet 1001, VLAN ID 2 DHCP DISCOVERY packet 1002, VLAN ID 3 DHCP DISCOVERY packet 1003, VLAN ID "X" DHCP DISCOVERY packet 1004, etc., until all the VLAN ID DHCP DISCOVERY packets (including VLAN ID 4093 DHCP DISCOVERY packet 1006, VLAN ID 4094 DHCP DISCOVERY packet 1007, and VLAN ID 4095 DHCP DISCOVERY packet 1008) are sent. The Ethernet switch 102 is configure to only forward VLAN ID "X" DHCP DISCOVERY packet 1004 to Device Y 103, where "X" is predefined by the network operator. Device Y 103 is where the DHCP server and/or the relay agent is located, and Device Y 103 is configured to only listen for traffic from VLAN ID "X". Once Device Y 103 (the DHCP server) receives VLAN ID "X" DHCP DISCOVERY packet 1004, Device Y 103 responds by sending VLAN ID "X" DHCP OFFER packet (message) 1005, which is relayed by the Ethernet switch 102 to Device X 101. Device X 101 (RU) will receive the response and inspect the VLAN ID contained in the received Ethernet frame (i.e., IEEE 802.1q Ethernet frame) to extract the VLAN ID "X".

Figure 2:
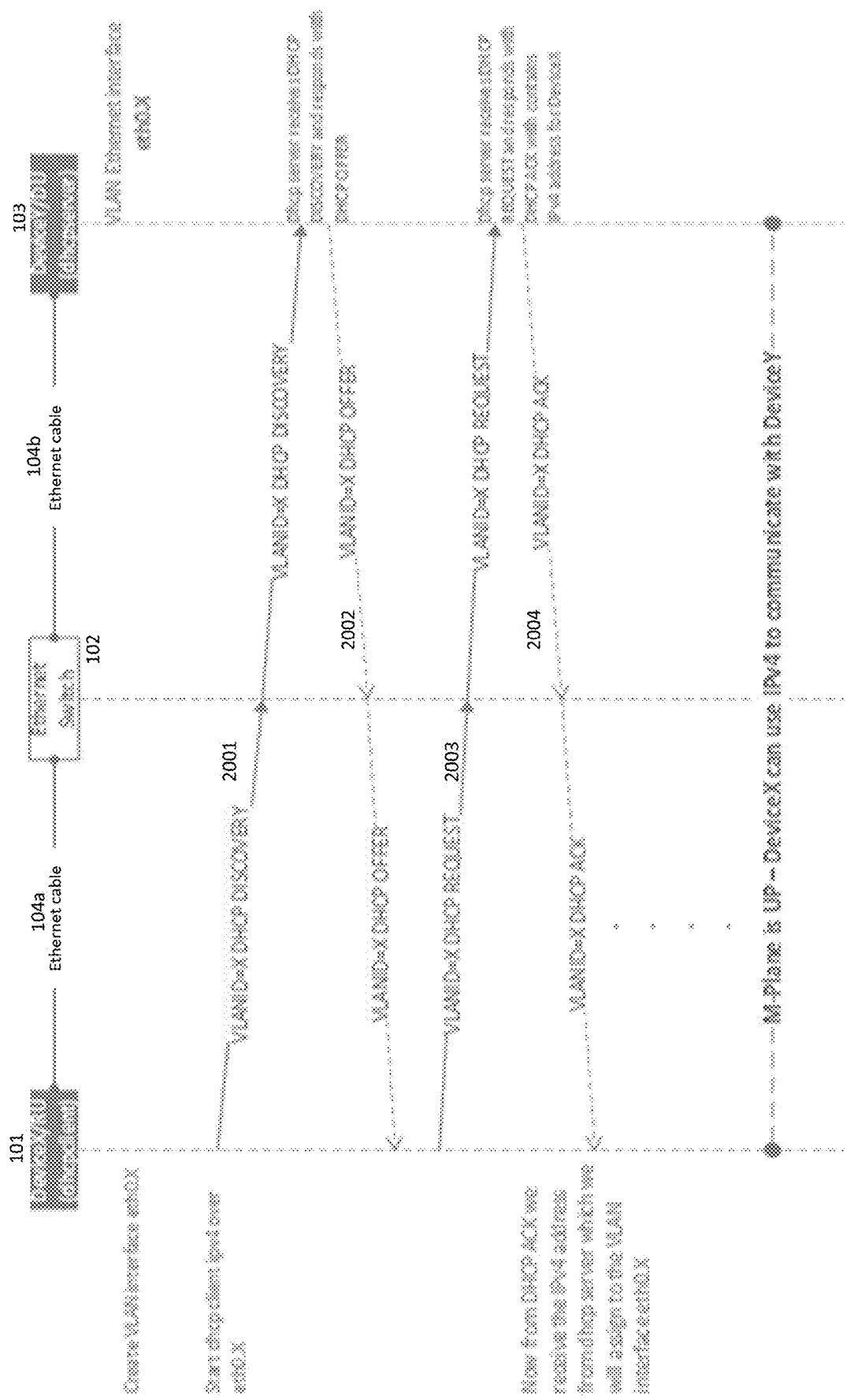
FIG. 2 illustrates an example DHCP IPv4 process.

FIG. 2 illustrates an example DHCP IPv4 process upon discovery of the relevant VLAN ID of the sought after DHCP server. Once the VLAN ID has been retrieved from the DHCP response (VLAN ID "X" DHCP OFFER), a software (e.g., "turbofast_vlan_discovery" software) executed by a processor creates a VLAN ethernet interface (referenced as "eth0.*x*" in FIG. 2) using the retrieved VLAN ID. In the example embodiment shown in FIG. 2, the "turbofast_vlan_discovery" software can be on the Device X 101 (e.g., RU), but the software can be on a PC or a network printer connected with an ethernet cable, for example. After the creation of the VLAN interface "eth0.*x*", the DHCP client is started over the VLAN interface where the DHCP protocol is executed to receive the IP address from the DHCP server. This step involves a DHCP handshake between the client and the server. As shown in FIG. 2, over the VLAN interface "eth0.*x*", VLAN ID "X" DHCP DISCOVERY message 2001 is sent by Device X 101 (the DHCP client) and relayed by the Ethernet switch 102 to Device Y 103 (the DHCP server). Device Y 103 responds to the VLAN ID "X" DHCP DISCOVERY message 2001 by sending VLAN ID "X" DHCP OFFER message 2002, which is relayed by the Ethernet switch 102 to Device X 101. In response to VLAN ID "X" DHCP OFFER message 2002, VLAN ID "X" DHCP REQUEST message 2003 is sent by Device X 101 (the DHCP client) and relayed by the Ethernet switch 102 to Device Y 103 (the DHCP server). Device Y 103 responds to the VLAN ID "X" DHCP REQUEST message 2003 by sending VLAN ID "X" DHCP ACK message 2004, which is relayed by the Ethernet switch 102 to Device X 101. VLAN ID "X" DHCP ACK message 2004 contains the IPv4 address for Device X 101, which IPv4 address is assigned to the VLAN interface "eth0.*x*". At this point, as shown in FIG. 2, the Management Plane (M-Plane) is up, and Device X 101 can use IPv4 to communicate with Device Y 103.

The discovered VLAN ID is then stored, e.g., in persistent memory, so it can be used again after a reboot of the system. In the case the VLAN ID has been changed, the DHCP client will fail, and this will trigger a new scan of the network, but given that the VLAN scan according to the present disclosure is very fast, the cost of running a new scan is minimal.

FIG. 3 illustrates an example method of a VLAN scan IPv6 to find a DHCP server IPv6. In FIG. 3, Device X 101 (e.g., an RU which is DHCP client) is connected by an Ethernet cable 104*a* to an Ethernet switch 102, which is in turn connected by an Ethernet cable 104b to Device Y 103 (e.g., a DU which is DHCP server for IPv6). As an alternate example embodiment, Device X 101 can be connected directly to Device Y 103 (e.g., in case Device Y 103 has a built-in Ethernet switch). Device X 101 sends to the network (using non-VLAN Ethernet interface "eth0") the raw VLAN ethernet trunk frames for VLAN ID 1 to VLAN ID 4095. In the example of FIG. 3, the VLAN trunk frames are DHCPv6 SOLICIT packets (messages), e.g., VLAN ID 1 DHCPv6 SOLICIT packet 3001, VLAN ID 2 DHCPv6 SOLICIT packet 3002, VLAN ID 3 DHCPv6 SOLICIT packet 3003, VLAN ID "X" DHCPv6 SOLICIT packet 3004, etc., until all the VLAN ID DHCPv6 SOLICIT packets (including VLAN ID 4093 DHCPv6 SOLICIT packet 3006, VLAN ID 4094 DHCPv6 SOLICIT packet 3007, and VLAN ID 4095 DHCPv6 SOLICIT packet 3008) are sent. The Ethernet switch 102 is configure to only forward VLAN ID "X" DHCPv6 SOLICIT packet 3004 to Device Y 103, where "X" is predefined by the network operator. Device Y 103 is where the DHCP server and/or the relay agent is located, and Device Y 103 is configured to only listen for traffic from VLAN ID "X". Once Device Y 103 (the DHCP server) receives VLAN ID "X" DHCPv6 SOLICIT packet 3004, Device Y 103 responds by sending VLAN ID "X" DHCPv6 ADVERTISE packet (message) 3005, which is relayed by the Ethernet switch 102 to Device X 101. Device X 101 (RU) will receive the response and inspect the VLAN ID contained in the received Ethernet frame (i.e., IEEE 802.1q Ethernet frame) to extract the VLAN ID "X".

Figure 4:
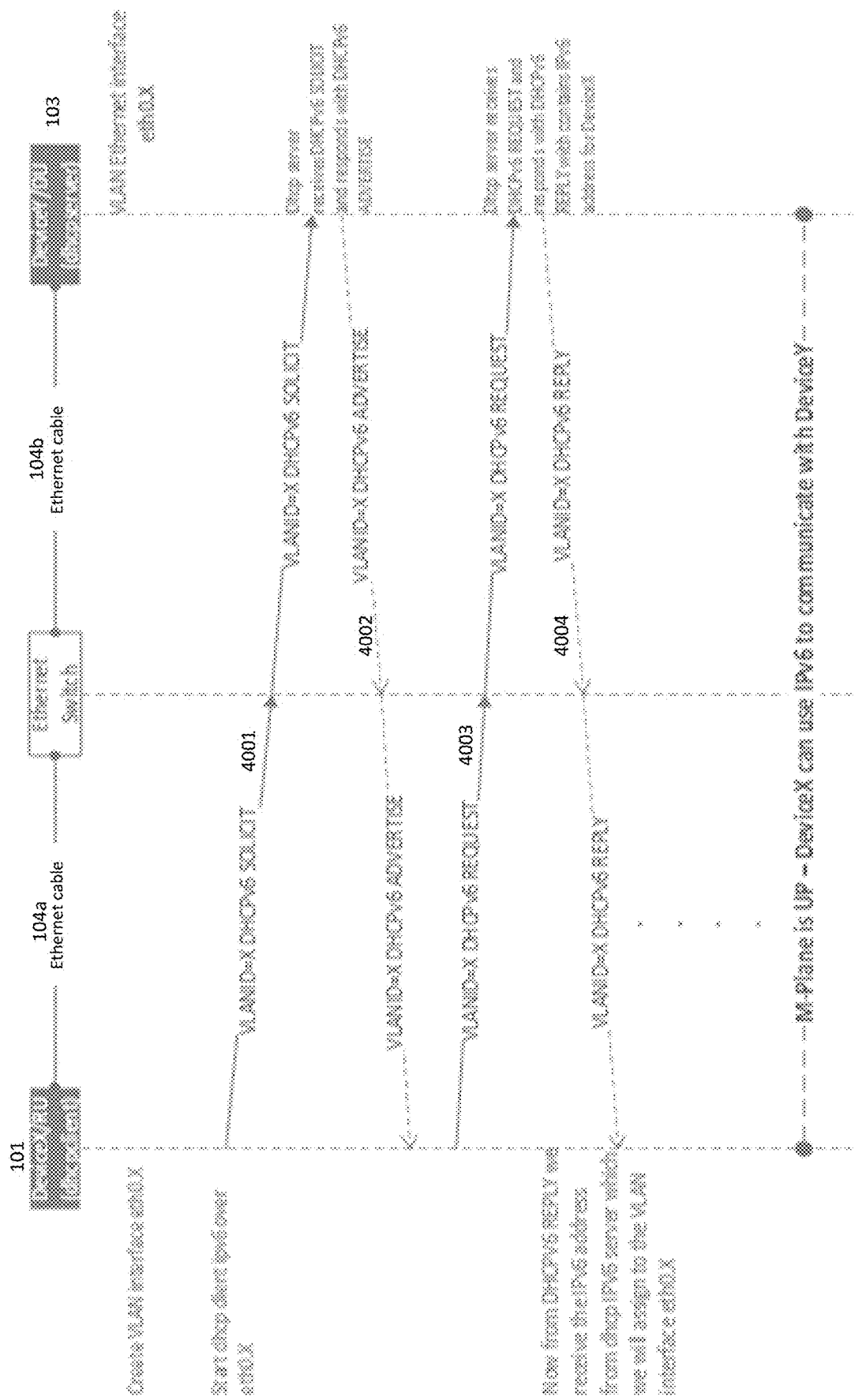
FIG. 4 illustrates an example DHCP IPv6 process.

FIG. 4 illustrates an example DHCP IPv6 process upon discovery of the relevant VLAN ID of the sought after DHCP server. Once the VLAN ID has been retrieved from the DHCP response (VLAN ID "X" DHCPv6 ADVERTISE), a software (e.g., "turbofast_vlan_discovery" software) executed by a processor creates a VLAN ethernet interface (referenced as "eth0.x" in FIG. 4) using the retrieved VLAN ID. In the example embodiment shown in FIG. 4, the "turbofast_vlan_discovery" software can be on the Device X 101 (e.g., RU), but the software can be on a PC or a network printer connected with an ethernet cable, for example. After the creation of the VLAN interface "eth0.x", the DHCP client is started over the VLAN interface where the DHCP protocol is executed to receive the IP address from the DHCP server. This step involves a DHCP handshake between the client and the server. As shown in FIG. 4, over the VLAN interface "eth0.x", VLAN ID "X" DHCPv6 SOLICIT message 4001 is sent by Device X 101 (the DHCP client) and relayed by the Ethernet switch 102 to Device Y 103 (e.g., the DHCP server for IPv6). Device Y 103 responds to the VLAN ID "X" DHCPv6 SOLICIT message 4001 by sending VLAN ID "X" DHCPv6 ADVERTISE message 4002, which is relayed by the Ethernet switch 102 to Device X 101. In response to VLAN ID "X" DHCPv6 ADVERTISE message 4002, VLAN ID "X" DHCPv6 REQUEST message 4003 is sent by Device X 101 (the DHCP client) and relayed by the Ethernet switch 102 to Device Y 103 (the DHCP server for IPv6). Device Y 103 responds to the VLAN ID "X" DHCPv6 REQUEST message 4003 by sending VLAN ID "X" DHCPv6 REPLY message 4004, which is relayed by the Ethernet switch 102 to Device X 101. VLAN ID "X" DHCPv6 REPLY message 4004 contains the IPv6 address for Device X 101, which IPv6 address is assigned to the VLAN interface "eth0.x". At this point, as shown in FIG. 4, the Management Plane (M-Plane) is up, and Device X 101 can use IPv6 to communicate with Device Y 103.

The discovered VLAN ID is then stored, e.g., in persistent memory, so it can be used again after a reboot of the system.

In the case the VLAN ID has been changed, the DHCP client will fail, and this will trigger a new scan of the network, but given that the VLAN scan according to the present disclosure is very fast, the cost of running a new scan is minimal.

According to an alternative example embodiment of the present disclosure, 4095 VLAN interfaces are provided and the DHCP client of each of the VLAN interfaces is run, i.e., the VLAN scanning is expedited by running 4095 DHCP clients in parallel. Among the 4095 DHCP clients, only one DHCP client will succeed as the DHCP server will only exist on one configured VLAN. This alternative embodiment is resource-intensive for the operating system memory due to the need to provide 4095 VLAN interfaces and run 4095 DHCP clients simultaneously.

The technique of injecting a large number of packets to discover a network service, as described in the present disclosure, is not limited to the VLAN scanning application. The disclosed technique can be used to quickly discover devices that are located on another VLAN, e.g., for security purpose such as identifying rogue devices which are not authorized on the network but trying to hide on another VLAN.

The invention claimed is:

1. An optimized method for expediting Virtual Local Area Network (VLAN) scanning process for discovery of the Management Plane (M-Plane) Dynamic Host Configuration Protocol (DHCP) server within an Open Radio Access Network (O-RAN) system, the method comprising:
   transmitting, by using a software tool executed by a processor, VLAN ethernet trunk frames including VLAN Identifier (ID) 1 to VLAN ID 4095, to an ethernet interface of a radio unit (RU) within the O-RAN system, wherein said ethernet interface of the RU is connected via an ethernet switch to a distributed unit (DU) within the O-RAN system, wherein the DHCP server is located at the DU;
   selectively forwarding, by the ethernet switch to the DU, only a VLAN ethernet trunk frame having a specified VLAN ID value X among the VLAN ID values 1 to 4095, wherein X is predefined by operator of the O-RAN system;
   selectively responding, by the DU, in response to receiving the VLAN ethernet trunk frame having the specified VLAN ID value X, by sending a DHCP response message to the RU; and
   identifying, by the RU from the DHCP response message, the specified VLAN ID value X corresponding to the DHCP server.

2. The method according to claim 1, further comprising:
   creating, by using the software tool, a VLAN ethernet interface for the identified VLAN ID value X.

3. The method according to claim 2, further comprising:
   initiating, over the VLAN ethernet interface, a DHCP client located at the RU to execute DHCP protocol to receive an IP address for the VLAN ethernet interface from the DHCP server.

4. The method according to 3, wherein the transmitting of the VLAN ethernet trunk frames is performed by the software tool using a raw socket application programming interface (API) service.

5. The method according to 3, wherein the VLAN trunk frames are DHCP Internet Protocol version 4 DHCP DISCOVERY packets.

6. The method according to claim 5, wherein:
   the DHCP protocol involves a DHCP handshake between the DHCP client and the DHCP server, including, in sequence:

sending, by the RU, VLAN ID X DHCP DISCOVERY message to the DU via the ethernet switch;
sending, by the DU, VLAN ID X DHCP OFFER message to the RU via the ethernet switch;
sending, by the RU, VLAN ID X DHCP REQUEST message to the DU via the ethernet switch; and
sending, by the DU, VLAN ID X DHCP ACK message to the RU via the ethernet switch, wherein the VLAN ID X DHCP ACK message contains an Internet Protocol version 4 (IPv4) address for the RU.

7. The method according to claim 6, further comprising: assigning the IPV4 address to the VLAN ethernet interface.

8. The method according to claim 3, wherein the VLAN trunk frames are DHCP Internet Protocol version 6 (DHCPv6) SOLICIT packets.

9. The method according to claim 8, wherein:
the DHCP protocol involves a DHCP handshake between the DHCP client and the DHCP server, including, in sequence:
sending, by the RU, VLAN ID X DHCPv6 SOLICIT message to the DU via the ethernet switch;
sending, by the DU, VLAN ID X DHCPv6 ADVERTISE message to the RU via the ethernet switch;
sending, by the RU, VLAN ID X DHCPv6 REQUEST message to the DU via the ethernet switch; and
sending, by the DU, VLAN ID X DHCPv6 REPLY message to the RU via the ethernet switch, wherein the VLAN ID X DHCPv6 REPLY message contains an Internet Protocol version 6 (IPv6) address for the RU.

10. The method according to claim 9, further comprising: assigning the IPV6 address to the VLAN ethernet interface.

11. A System for expediting Virtual Local Area Network (VLAN) scanning process for discovery of the Management Plane (M-Plane) Dynamic Host Configuration Protocol (DHCP) server within an Open Radio Access Network (O-RAN) system, the method comprising:
a processor executing a software tool to transmit VLAN ethernet trunk frames including VLAN Identifier (ID) 1 to VLAN ID 4095, to an ethernet interface of a radio unit (RU) within the O-RAN system, wherein said ethernet interface of the RU is connected via an ethernet switch to a distributed unit (DU) within the O-RAN system, wherein the DHCP server is located at the DU;
wherein the ethernet switch is configured to selectively forward to the DU only a VLAN ethernet trunk frame having a specified VLAN ID value X among the VLAN ID values 1 to 4095, wherein X is predefined by operator of the O-RAN system;
wherein the DU is configured to selectively respond, in response to receiving the VLAN ethernet trunk frame having the specified VLAN ID value X, by sending a DHCP response message to the RU; and
wherein the RU is configured to identify, from the DHCP response message, the specified VLAN ID value X corresponding to the DHCP server.

12. The system according to claim 11, wherein:
the processor executing the software tool further creates a VLAN ethernet interface for the identified VLAN ID value X.

13. The system according to claim 12, wherein:
over the VLAN ethernet interface, a DHCP client located at the RU is initiated to execute DHCP protocol to receive an IP address for the VLAN ethernet interface from the DHCP server.

14. The system according to claim 13, wherein the transmitting of the VLAN ethernet trunk frames is performed by the software tool using a raw socket application programming interface (API) service.

15. The system according to claim 13, wherein the VLAN trunk frames are DHCP Internet Protocol version 4 DHCP DISCOVERY packets.

16. The system according to claim 15, wherein:
the DHCP protocol involves a DHCP handshake between the DHCP client and the DHCP server, including, in sequence:
sending, by the RU, VLAN ID X DHCP DISCOVERY message to the DU via the ethernet switch;
sending, by the DU, VLAN ID X DHCP OFFER message to the RU via the ethernet switch;
sending, by the RU, VLAN ID X DHCP REQUEST message to the DU via the ethernet switch; and
sending, by the DU, VLAN ID X DHCP ACK message to the RU via the ethernet switch, wherein the VLAN ID X DHCP ACK message contains an Internet Protocol version 4 (IPv4) address for the RU.

17. The system according to claim 16, wherein:
the IPV4 address is assigned to the VLAN ethernet interface.

18. The system according to claim 13, wherein the VLAN trunk frames are DHCP Internet Protocol version 6 (DHCPv6) SOLICIT packets.

19. The system according to claim 18, wherein:
the DHCP protocol involves a DHCP handshake between the DHCP client and the DHCP server, including, in sequence:
sending, by the RU, VLAN ID X DHCPv6 SOLICIT message to the DU via the ethernet switch;
sending, by the DU, VLAN ID X DHCPv6 ADVERTISE message to the RU via the ethernet switch;
sending, by the RU, VLAN ID X DHCPv6 REQUEST message to the DU via the ethernet switch; and
sending, by the DU, VLAN ID X DHCPv6 REPLY message to the RU via the ethernet switch, wherein the VLAN ID X DHCPv6 REPLY message contains an Internet Protocol version 6 (IPv6) address for the RU.

20. The system according to claim 19, wherein:
the IPV6 address is assigned to the VLAN ethernet interface.

* * * * *